April 15, 1924.

W. E. CARVER 1,490,091

ADJUSTABLE COUPLING FOR TIRE CHAINS

Filed Oct. 6, 1923

Inventor
William E. Carver.
By A. J. O'Brien
Attorney

Patented Apr. 15, 1924.

1,490,091

UNITED STATES PATENT OFFICE.

WILLIAM E. CARVER, OF DENVER, COLORADO.

ADJUSTABLE COUPLING FOR TIRE CHAINS.

Application filed October 6, 1923. Serial No. 666,938.

*To all whom it may concern:*

Be it known that I, WILLIAM E. CARVER, citizen of the United States, residing at Denver, in the city and county of Denver and State of Colorado, have invented certain new and useful Improvements in Adjustable Couplings for Tire Chains; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to tire chains of the type commonly referred to as non-skid chains and has special reference to a coupling which will positively hold the chains on the tire and by means of which the chains can be tightened to the extent required.

Everyone who has driven an automobile knows the importance of non-skid chains on wet or muddy roads. On a wet, hard surfaced road, like that of concrete or asphalt, there is constant danger of sidewise skidding when the road surface is wet and on dirt roads the mud does not afford sufficient resistance to enable the proper traction to be obtained.

Tire chains, as a general thing, come provided with hooks, by means of which the ends are connected, but these are not reliable and unless wired shut they open and permit the chains to fall off the wheels. The loss of a chain under such circumstances is ordinarily not discovered until the car skids or gets stuck in the mud and even when no damage is caused and when other chains are available, it necessitates a large amount of disagreeable labor to put a chain in place when the car wheel is mired. Besides the danger of losing the chains, due to the opening of the hooks, there is the additional objection that chains secured by means of hooks cannot be tightened and will slip when subjected to strains.

It is the object of this invention to produce a coupling device that can be relied upon to hold the chains in place and by means of which the chain can be tightened so as to hold it from slipping. The above and other objects that will become apparent as the description proceeds are obtained by means of a construction which I will now describe in detail, reference for this purpose being had to the accompanying drawing in which my invention is illustrated, and in which.

The same reference characters will be used to designate the same parts throughout the several views.

Numeral 1 indicates a pneumatic casing of an automobile wheel and 2 the side member of a non-skid chain which is of the ordinary construction and has cross-chains 3. The ends of the side members 2, instead of being connected by means of hooks as is commonly done, are connected by means of an improved form of turn-buckle especially designed to meet the particular requirements of this service.

Figure 1:
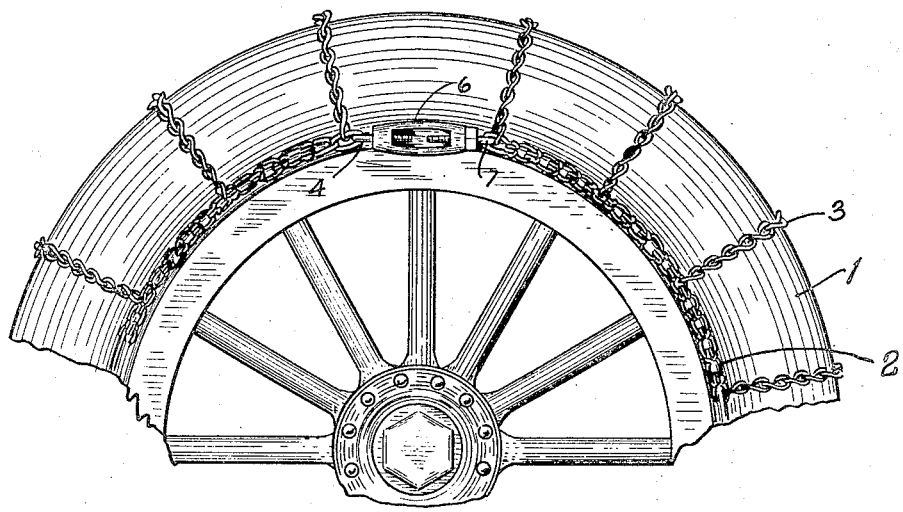
Fig. 1 is a side elevation of a portion of an automobile wheel showing the chain in place thereon and held by my adjustable connector.
Figure 2:
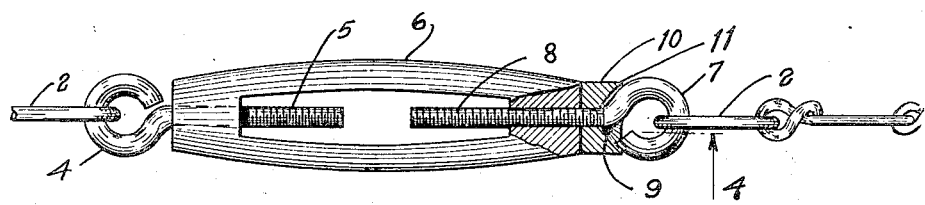
Fig. 2 is a plan view of my improved connector showing the locking nut in section.

In Fig. 2 I have shown a portion of each end of the side member 2 which is usually a chain, but may be made of a wire rope, if desired. One end of the side member is connected to the eye 4 of the screw 5 which is threadedly connected with one end of the body portion 6 of the turn-buckle. The other end of the side member is connected to the eye 7 of the screw 8, which is threadedly connected to the other end of the body portion 6. Screws 5 and 8 are formed with right- and left-hand threads in the usual manner. The turn-buckle, as far as it has been described, is old and well known; but would, without further modification, be unsuited for the purpose under consideration. The ends of the side members must be disconnected for applying and removing the chain and for this purpose the eye 7 is provided with an opening 9 which is large enough to permit the end link of side member 2 to be inserted into the eye or removed therefrom. In order to prevent the link from jumping out of the eye when the car is in motion, I provide a nut 10 which is threaded to the screw 8. This nut has one side concave and provided with flanges 11 that project down over the eye 7 a sufficient distance to close the gap 11, the object being to prevent the chain from becoming disconnected and lost. The nut 10 may also be used as a lock nut by being screwed tightly against the end of the body member in the manner shown in Fig. 2.

Figure 3:
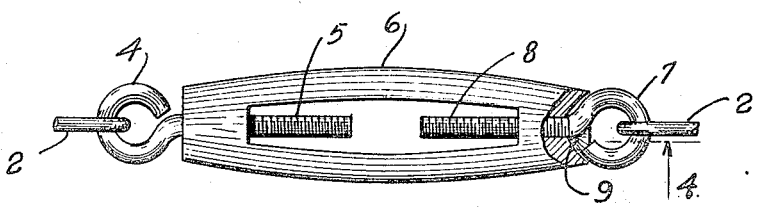
Fig. 3 is a plan view of a modified form of connector.

In Fig. 3 I have shown a modification in which the lock nut 10 is dispensed with and the end of the body member 6 modified so that it will close the gap 9. For this purpose the end of the body member is made with a conical cavity whose sides extend over the eye 7 in the manner shown.

In the construction shown in Fig. 3 there is no lock nut and consequently the turn-buckle is free to rotate to open position, but there is little danger of it doing so, as there is no force tending to turn it and besides the screws get covered with mud and this causes considerable friction which prevents the parts from rotating.

Figure 4:
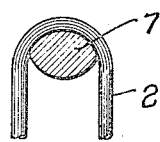
Fig. 4 is a section taken on line 4—4, Figs. 2 and 3.

In order to prevent excessive wear of the end links which are connected to the eyes 4 and 7, the latter are being made with an oblong cross-section such as shown in Fig. 4. The ends of the screws 5 and 8 may be slightly upset so as to prevent them from becoming detached from the body member.

The chain equipped with my adjustable coupler is put in place about the wheel in the same manner as any other chain and the end link hooked into the eye 7. It is, of course, understood that before the chains are put on, the turn-buckle is extended so that the chains may be adjusted as tightly as may be desired. By means of the locking nut 10 the screw 8 is held against rotation.

From the above it is apparent that I have produced a coupler for tire chains which admits of tightening the chains on the tire and which positively prevents the chains from becoming disconnected and lost.

Having now described my invention, what I claim as new is:

1. An adjustable coupling means for tire chains comprising, in combination, an elongated body member having a threaded opening in each end, one of said openings having a right-hand thread and the other a left-hand thread; a screw cooperatively connected with each opening, said screws, each having an eyelet, one of said eyelets being closed and the other provided with an opening; and means for closing said opening when the coupling means is in operative position, said means comprising a member having a concave portion adapted to cooperate with the eyelet.

2. An adjustable coupling means for tire chains comprising, in combination, an elongated body member having a threaded opening in each end, one of said openings having a right-hand thread and the other a left-hand thread; a screw cooperatively connected with each opening, said screws, each having an eyelet, one of said eyelets being closed and the other provided with an opening; means for closing said opening when the coupling means is in operative position, said means comprising a member having a concave portion adapted to cooperate with the eyelet; and means for locking one of said screws against rotation.

In testimony whereof I affix my signature.

WILLIAM E. CARVER.